(12) United States Patent
Hecker et al.

(10) Patent No.: US 11,643,110 B2
(45) Date of Patent: May 9, 2023

(54) STEERING METHOD FOR AN AUTONOMOUSLY STEERED VEHICLE

(71) Applicant: Knorr-Bremse Systeme Fuer Nutzfahrzeuge GmbH, Munich (DE)

(72) Inventors: Falk Hecker, Markgroeningen (DE); Jens-Hauke Mueller, Velbert-Neviges (DE); Peter Heimbrock, Wermelskirchen (DE); Juergen Steinberger, Groebenzell (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 130 days.

(21) Appl. No.: 16/977,011

(22) PCT Filed: Mar. 7, 2019

(86) PCT No.: PCT/EP2019/055719
§ 371 (c)(1),
(2) Date: Aug. 31, 2020

(87) PCT Pub. No.: WO2019/170808
PCT Pub. Date: Sep. 12, 2019

(65) Prior Publication Data
US 2021/0009162 A1   Jan. 14, 2021

(30) Foreign Application Priority Data

Mar. 9, 2018  (DE) .......................... 102018105508.0
Mar. 22, 2018 (DE) .......................... 102018106889.1

(51) Int. Cl.
| | | |
|---|---|---|
| *B60W 60/00* | (2020.01) | |
| *B60W 10/18* | (2012.01) | |
| *B60W 10/20* | (2006.01) | |
| *B60W 50/02* | (2012.01) | |
| *B60W 50/029* | (2012.01) | |
| *B62D 5/04* | (2006.01) | |
| *B62D 5/09* | (2006.01) | |

(52) U.S. Cl.
CPC ........ *B60W 60/0016* (2020.02); *B60W 10/18* (2013.01); *B60W 10/20* (2013.01); *B60W 50/0205* (2013.01); *B60W 50/029* (2013.01); *B62D 5/0457* (2013.01); *B62D 5/09* (2013.01)

(58) Field of Classification Search
CPC .. B60W 60/0016; B60W 10/18; B60W 10/20; B60W 50/0205; B60W 50/029; B62D 5/0457; B62D 5/09
See application file for complete search history.

(56) References Cited

U.S. PATENT DOCUMENTS

| | | | |
|---|---|---|---|
| 4,660,671 A | 4/1987 | Behr et al. | |
| 2020/0290588 A1* | 9/2020 | Källstrand | ............. B62D 9/002 |

FOREIGN PATENT DOCUMENTS

| | | |
|---|---|---|
| CN | 104176115 A | 12/2014 |
| CN | 106125722 A | 11/2016 |
| CN | 107000726 A | 8/2017 |
| DE | 102008046007 A1 | 3/2010 |
| DE | 102014200608 A1 | 7/2015 |
| DE | 102014107914 A1 | 12/2015 |
| DE | 102014013756 B3 | 2/2016 |
| DE | 102015112755 A1 | 2/2017 |
| EP | 2805871 A2 | 11/2014 |

OTHER PUBLICATIONS

International Search Report dated Jun. 7, 2019 In Connection With PCT/EP2019/055719.

* cited by examiner

*Primary Examiner* — Nicholas Kiswanto
*Assistant Examiner* — Jamal A Shah
(74) *Attorney, Agent, or Firm* — Norton Rose Fulbright US LLP; Gerard Messina; Aaron Deditch

(57) ABSTRACT

A steering method for an autonomously steered vehicle having a hybrid steering system, including: identifying a malfunction during an autonomous driving procedure, wherein the hybrid steering system includes a hydraulic steering assistance system, an electromechanical steering assistance system and a control unit for monitoring and controlling the autonomous driving procedure of the vehicle, and switching the steering task by the control unit to a steering braking procedure, by which the vehicle is steered by braking at least one wheel, wherein due to the braking force that is acting on the scrub radius, a steering torque is produced that causes the wheels to turn. Also described is a related a servo-assisted steering assembly.

15 Claims, No Drawings

STEERING METHOD FOR AN AUTONOMOUSLY STEERED VEHICLE

FIELD OF THE INVENTION

The present invention relates to a steering method for an autonomously steered vehicle having a hybrid steering system, comprising a hydraulic steering assistance system, an electromechanical steering assistance system and a control unit for monitoring and controlling a driving procedure of the vehicle.

Furthermore, the invention relates to a servo-assisted steering assembly for an autonomously steered vehicle having a hybrid steering system, comprising
- at least one hydraulic servo valve that functions as a hydraulic steering assistance system and comprises an actuator for controlling the steering assistance system in dependence upon a relative rotation of an input shaft with respect to an output shaft,
- at least one electromechanical steering assistance system that functions as a superimposed steering system, wherein the superimposed steering system boosts the supporting steering torque in response to a boost curve,
- a control unit for monitoring and controlling the driving procedure of the vehicle.

BACKGROUND INFORMATION

Steering apparatuses that are equipped with suitable supporting systems and assist systems in motor vehicles are sufficiently understood. Such steering apparatuses range from servo-assisted steering systems to self-acting steering systems.

Servo-assisted steering assemblies for hydraulic servo-assisted steering systems of this type in vehicles include servo valves that are also known as rotator valves (rotary slide valves). These regulate the hydraulic pressure and consequently the steering assistance in dependence upon the steering torque that is provided by the driver. Rotator valves are mainly used where an input shaft, which is connected via a steering column to a steering wheel, rotates relative to a valve part (also referred to as an actuator, a valve casing or sleeve), said valve part being connected to the output shaft and in the case of rack-and-pinion steering systems to a steering pinion (also referred to as a pinion). In the case of a recirculating-ball steering system (also a block steering system in a truck), the control sleeve is connected to the valve spindle. By a torsion system between the input shaft and the actuator, a torque-dependent adjustment of the actuator of the servo valve and consequently a torque-dependent valve characteristic and thus a steering force assist characteristic are realized.

In order to realize different further functions of a torque adjuster, in particular a lane-keeping assistance system, a parking pilot, steering torque superimposed system, autonomous driving, etc., it is necessary and likewise well-known to influence the steering force assist characteristic of the servo valve independently of the prevailing torque at the input shaft.

Hybrid steering systems that comprise both a hydraulic and also an electromechanical steering assistance system are known in particular in the commercial vehicle industry. In this case, the hydraulic steering assistance system is mainly energized by way of a pump that is driven by the internal combustion engine. In contrast, the electrical steering assistance system is usually energized by the alternator. In suitable driving situations in which steering does not occur or only little steering occurs, i.e. in particular during the autonomous drive, the volume flow in the hydraulic system is reduced by virtue of an active restriction by the controllable volume flow adjusting mechanism. In this case, the remaining steering force assistance is predominantly provided in an electromotive manner. The servo assistance is provided mainly by the hydraulic steering assistance system only in driving situations in which the required steering assistance is greater than the maximal possible electromotive servo torque.

The two components of the hybrid steering system are usually coordinated with one another such that it is possible to realize a best possible steering sensation. This applies both for the case that the electrical superimposition functions and thus can influence the steering sensation in a very sensitive and flexible manner and also for the case that this superimposition is passive and the steering system functions purely in a mechanical-hydraulic manner. In the case of some electromechanical superimposed systems, sufficient torque is applied in order to render it possible to only assist the electrical superimposition in the event of a malfunction of the hydraulic system. Consequently, it is possible in this case to fulfill the requirements of ECE R79.

In the event of any malfunction, it is necessary for vehicles, in particular commercial vehicles having highly-automated driving functions that take over from the driver the task of guidance and responsibility for guidance for at least a limited period of time, to continue the vehicle guidance in a reliable manner as long as possible until the driver takes back the responsibility. The system characteristic "Fail Operational" that is derived therefrom requires that the basic functions continue to be ensured in particular on the execution level albeit possibly with functional limitations.

For the lateral guidance of the vehicle, this means that in the event of any malfunction in the steering system the vehicle must despite this continue to keep in the lane. This is in particular especially difficult if the electromechanical steering assistance system is affected by the malfunction since in the event of a hydraulic failure the electromechanical assistance is sufficient at least in the case of lower steering torque requirements.

SUMMARY OF THE INVENTION

An object of the present invention is to provide a steering method with which an autonomously steered vehicle can still be safely steered at least for a foreseeable period of time even in the event that a malfunction occurs. It is to be possible for the method to be implemented using a simple configuration, as far as possible without or with only a small number of additional vehicle attachments. Furthermore, it is the object of the invention to propose a servo-assisted steering assembly by which the method in accordance with the invention can be implemented.

DETAILED DESCRIPTION

A steering method includes the following method steps:
- identify a malfunction during an autonomous driving procedure,
- switch the steering task by the control unit to a steering braking procedure, by which the vehicle is steered by virtue of braking at least one wheel with the result that, due to the braking force that is acting with the scrub radius, a steering torque is produced that causes the wheels to turn.

The servo-assisted steering assembly in accordance with the invention for an autonomously steered vehicle having a hybrid steering system is characterized in that the control unit is programmed so that upon recognizing a malfunction during an autonomous driving procedure the steering task is switched to a steering braking procedure, the servo-assisted steering assembly is coordinated so that frictional torques that occur above the hydraulic servo valve do not have any influence on the hydraulic pressures that are acting in the chambers of the hydraulic steering assistance and consequently do not subject the steering braking procedure to a counter torque.

The invention is based on actively steering the vehicle by the brakes in the event of a malfunction. Due to the positive scrub radius in the case of heavy goods vehicles, this steering task can be assumed by virtue of purposefully braking the left-hand and right-hand front wheel. In this case, due to the braking force that is acting with the scrub radius, a steering torque is produced that leads to the wheels turning and thus to the steering wheel rotating. The effect of the one-sided braking action on the yawing moment provides the method with additional support but this alone is not sufficient.

The scrub radius (also referred to as kingpin offset) describes on steerable axles of vehicles the distance between an imaginary, extended line of the steering axis of rotation and the middle of wheel contact surface. The scrub radius is influenced by the camber, kingpin angle and the offset of the wheel. If the imaginary line of the steering axis of rotation meets the middle of the wheel contact surface precisely, the scrub radius is 0, if said imaginary line meets the wheel contact surface further outward the value of the scrub radius is negative, if said imaginary line meets the wheel contact surface further inward the scrub radius is referred to as being positive.

Although steering braking is fundamentally known, for example in the case of tracked vehicles or agricultural tractors, where the steering effect is produced exclusively by way of the induced yawing torque, it is however not known in conjunction with a positive scrub radius and a hydraulic steering assistance system. Problematic in this case are namely frictional torques above the hydraulic steering gear which in the case of an intact hydraulic system generate a counter torque on the wheel by way of the rotary slide valve and the enhanced boost curve and consequently considerably reduce the efficiency of the steering braking procedure. Such counter torques are generated in particular in the case of hybrid steering systems by the upstream electrical torque superimposed steering system (e.g. column drive EPS with worm drive). The result is that a steering brake loses a considerable amount of efficiency and is hardly suitable or is only suitable to a very limited extent as a fall-back level for the lateral guidance task.

A fundamental aspect of the invention is to configure the steering procedure by virtue of adjusting the hydraulic boost curve so that the frictional torques that occur above the hydraulic rotary slide valve do not have any effect on the hydraulic pressures that are acting in the chambers of the steering system and consequently do not generate any negative counter torque for the steering braking procedure.

The invention renders it possible to use the in principle very effective steering brake as a cost-effective redundancy for the lateral guidance. It is consequently possible to use steering brakes also in the case of superimposed steering systems where the frictional torque is higher.

The hydraulic boost curve illustrates the relationship between the input torque, which is applied by the driver superimposed by the electrical assistance torque (in the case of hybrid steering systems), and the assistance torque that the hydraulic system generates at the output of the steering gear.

The boost curve comprises multiple features that improve the steering awareness of the driver. It is for example desired to provide a slight boost of the curve in the case of small input torques. In the case of a slight boost of the curve, the assistance torque is correspondingly low, whereby the steering system is not unnecessarily sensitive to very small adjustments of the input torque when the vehicle is travelling in a straight line. A further desirable feature of a boost curve is that the gradient of the curve is high in the case of high values of the input torque. This is for example advantageous during maneuvers at a low speed, such as for example during parking maneuvers.

The hydraulic boost curve typically follows a continuous curve that follows the applied input torque.

In a particularly advantageous design variant, the electrical superimposed steering system compensates the effects of the hydraulic boost curve on the steering sensation so as to render possible a steering braking procedure in the event of a malfunction, said hydraulic boost curve having changed in accordance with the invention. Consequently, the steering sensation does not change during the normal driving operation.

The hydraulic boost curve is adjusted in accordance with the invention so that the servo valve or rotary slide valve is configured to be less sensitive in particular in the middle position than is otherwise usual.

In accordance with an exemplary embodiment, hydraulic control edges are provided for this purpose in the servo valve so that up to a determined frictional torque (e.g. ±3 Nm, which may be ±2 Nm) there is no pressure difference in the chambers and consequently also a counter torque is not generated. As a consequence, a so-called dead band is generated, the angle difference in the rotary slide valve is greater.

As an alternative or in addition thereto, the torsion bar—which likewise codetermines the characteristic of the boost curve—can be adjusted accordingly. The frictional torques then cause for example virtually no deflection if the torsion bar is configured to be more rigid than is otherwise usual. It is also possible to realize by this feature that up to a determined frictional torque (e.g. ±3 Nm, which may be ±2 Nm) there is no pressure difference in the chambers.

The two described possibilities cause the response behavior of the steering system to be slower. In this respect, it is of particular advantage if the superimposed steering system compensates the effects of the changed boost curve on the steering sensation in the normal driving operation or in the control mode.

In accordance with the invention, it is also possible by closing down the hydraulic steering assistance system to completely negate the adjustment of the boost curve that forms the basis of the function of the superimposed steering system. In other words, the hydraulic steering assistance system is circumvented in this case during the steering braking procedure, the hydraulic system becomes in principle ineffective. This can inter alia also be realized by virtue of short-circuiting the hydraulic forward flow by the return flow of the servo valve. In accordance with the invention, an internal pressure delimiting valve can be opened for this purpose, for example by a suitable actuator system, an external solenoid valve or also by switching off the hydraulic pump. In the case of a hydraulic pump that is operated by an internal combustion engine, a corresponding coupling is suitable for this purpose, in the event that the pump is electrically driven (power pack), this could be forced actively into a standby-mode or similar.

In accordance with the invention, it is also possible by reducing the volume flow ($EV^2$ or power pack) to use the effect that as a consequence the hydraulic boost curve likewise reacts in a delayed manner around the middle position in the response behavior. Consequently, a volume flow regulating procedure also leads to the desired result.

The invention is not limited to the described exemplary embodiments but rather also includes further variants that use the basic principle of the invention.

The invention claimed is:

1. A steering method for an autonomously steered vehicle having a hybrid steering system, the method comprising:
   identifying a malfunction during an autonomous driving procedure, wherein the hybrid steering system includes a hydraulic steering assistance system, an electromechanical steering assistance system and a control unit for monitoring and controlling the autonomous driving procedure of the vehicle; and
   switching a steering task by the control unit to a steering braking procedure, by which the vehicle is steered by braking at least one wheel, wherein due to the braking force that is acting on a scrub radius, a steering torque is produced that causes wheels to turn;
   wherein at least one hydraulic servo valve functions as the hydraulic steering assistance system and includes an actuator for controlling the hydraulic steering assistance system in dependence upon a relative rotation of an input shaft with respect to an output shaft,
   wherein the electromechanical steering assistance system functions as a superimposed steering system, wherein the superimposed steering system boosts a supporting steering torque in response to a boost curve,
   wherein the control unit is configured so that upon recognizing a malfunction during an autonomous driving procedure a steering task is switched to a steering braking procedure, and
   wherein the servo-assisted steering assembly is coordinated so that frictional torques that occur above the hydraulic servo valve do not have any influence on hydraulic pressures that are acting in chambers of the hydraulic steering assistance system and do not subject the steering braking procedure to a counter torque.

2. The method as claimed in claim 1, wherein the steering braking procedure is implemented by braking a left-hand and/or a right-hand front wheel of the vehicle.

3. The method as claimed in claim 1, wherein the hydraulic steering assistance system is closed down.

4. The method as claimed in claim 3, wherein the hydraulic steering assistance system is closed down by short-circuiting a hydraulic forward flow by a hydraulic return flow.

5. The method as claimed in claim 1, wherein a boost curve that forms a function of a superimposed steering system is adjusted by a volume flow regulating procedure, by reducing the volume flow.

6. A servo-assisted steering assembly for an autonomously steered vehicle having a hybrid steering system, comprising:
   at least one hydraulic servo valve that functions as a hydraulic steering assistance system and includes an actuator for controlling a steering assistance system in dependence upon a relative rotation of an input shaft with respect to an output shaft;
   at least one electromechanical steering assistance system that functions as a superimposed steering system, wherein the superimposed steering system boosts a supporting steering torque in response to a boost curve; and
   a control unit for monitoring and controlling a driving procedure of the vehicle;
   wherein the control unit is configured so that upon recognizing a malfunction during an autonomous driving procedure a steering task is switched to a steering braking procedure, and
   wherein the servo-assisted steering assembly is coordinated so that frictional torques that occur above the hydraulic servo valve do not have any influence on hydraulic pressures that are acting in chambers of the hydraulic steering assistance system and do not subject the steering braking procedure to a counter torque.

7. The servo-assisted steering assembly of claim 6, wherein a hydraulic boost curve that forms a function of the superimposed steering system takes into consideration the occurring frictional torques so that they do not have any effect on the hydraulic pressures that are acting in the chambers of the hydraulic steering assistance system.

8. The servo-assisted steering assembly of claim 7, wherein the hydraulic boost curve is adjusted by correspondingly shaping hydraulic control edges in a servo valve that includes a rotary slide valve.

9. The servo-assisted steering assembly of claim 8, wherein the hydraulic boost curve is adjusted by selecting a corresponding amount of rigidity in a torsion bar in a servo valve that includes a rotary slide valve.

10. The servo-assisted steering assembly of claim 6, wherein up to a frictional torque from minus 3 Nm to plus 3 Nm, there is no pressure difference in the chambers of the hydraulic steering assistance system.

11. The servo-assisted steering assembly of claim 6, wherein the superimposed steering system and the control unit is configured so that an effect of the hydraulic boost curve on a steering sensation is compensated in a control mode, the hydraulic boost curve being adjusted to the occurring frictional torques.

12. The servo-assisted steering assembly of claim 6, wherein the boost curve that forms a function of the superimposed steering system is negated by closing down the hydraulic steering assistance.

13. The servo-assisted steering assembly of claim 12, wherein the hydraulic steering assistance system is closed down by short-circuiting a hydraulic forward flow by a hydraulic return flow.

14. The servo-assisted steering assembly of claim 13, wherein the hydraulic forward flow is short-circuited by opening an internal pressure delimiting valve by a suitable actuator system, by actuating an external solenoid valve or by switching off a hydraulic pump by a coupling.

15. The servo-assisted steering assembly of claim 6, wherein up to a frictional torque from minus 2 Nm to plus 2 Nm, there is no pressure difference in the chambers of the hydraulic steering assistance system.

* * * * *